(12) United States Patent
Yamaguchi et al.

(10) Patent No.: US 8,392,833 B2
(45) Date of Patent: Mar. 5, 2013

(54) IMAGE FORMING APPARATUS

(75) Inventors: Takeshi Yamaguchi, Osaka (JP);
Masanori Matsumoto, Osaka (JP);
Syoichiro Yoshiura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 516 days.

(21) Appl. No.: 12/606,305

(22) Filed: Oct. 27, 2009

(65) Prior Publication Data
US 2010/0107064 A1  Apr. 29, 2010

(30) Foreign Application Priority Data
Oct. 28, 2008  (JP) ................................. 2008-276513

(51) Int. Cl.
*G06F 17/00*   (2006.01)
*H04N 1/46*    (2006.01)

(52) U.S. Cl. ........ 715/274; 715/205; 715/243; 715/255; 715/791; 358/1.9; 358/528

(58) Field of Classification Search .................. 715/200, 715/201, 203, 204, 205, 210, 231, 234, 243, 715/251, 273, 274, 700, 760, 796, 255, 256, 715/FOR. 237; 358/1.1, 1.2, 1.9, 2.1, 448, 358/474, 505, 528, 538
See application file for complete search history.

(56) References Cited

U.S. PATENT DOCUMENTS

| | | | |
|---|---|---|---|
| 6,081,682 A * | 6/2000 | Sasaki et al. | 399/208 |
| 6,222,545 B1 * | 4/2001 | Suzuki et al. | 345/418 |
| 6,285,842 B1 * | 9/2001 | Katamoto et al. | 399/81 |
| 6,356,719 B1 * | 3/2002 | Yoshiura | 399/45 |
| 7,405,840 B2 * | 7/2008 | Yamaguchi | 358/1.18 |
| 7,483,166 B2 * | 1/2009 | Kadoi et al. | 358/1.18 |
| 7,545,535 B2 * | 6/2009 | Zhen | 358/1.9 |
| 7,728,824 B2 * | 6/2010 | Morioka | 345/173 |
| 7,839,512 B2 * | 11/2010 | Kotani et al. | 358/1.13 |
| 7,839,520 B2 * | 11/2010 | Natori | 358/1.15 |
| 2004/0085582 A1 * | 5/2004 | Yamaguchi | 358/1.18 |
| 2004/0207859 A1 * | 10/2004 | Kadoi et al. | 358/1.1 |
| 2005/0012941 A1 * | 1/2005 | Takahashi | 358/1.2 |
| 2006/0023240 A1 * | 2/2006 | Natori | 358/1.13 |
| 2006/0109497 A1 * | 5/2006 | Ferlitsch et al. | 358/1.15 |
| 2007/0229457 A1 * | 10/2007 | Sakurai | 345/157 |
| 2007/0236754 A1 * | 10/2007 | Tashiro et al. | 358/486 |

FOREIGN PATENT DOCUMENTS

| | | |
|---|---|---|
| JP | 11-275308 | 10/1999 |
| JP | 2006-311065 | 11/2006 |

* cited by examiner

*Primary Examiner* — Maikhanh Nguyen
(74) *Attorney, Agent, or Firm* — Renner, Otto, Boisselle & Sklar, LLP

(57) ABSTRACT

Provided is an image forming apparatus having a preview function and an original paper size automatic detection function, capable of displaying a preview of original image data immediately next a detected original paper size has been switched with a simple operation. On receipt of an operation of a next skip button by a user, a preview image display control portion refers to a paper size recording table and displays a preview of image data of a top page in the group (unit) next to the group in which the preview of the image data of the top page is currently displayed, the group being different in a paper size from the other group.

6 Claims, 14 Drawing Sheets

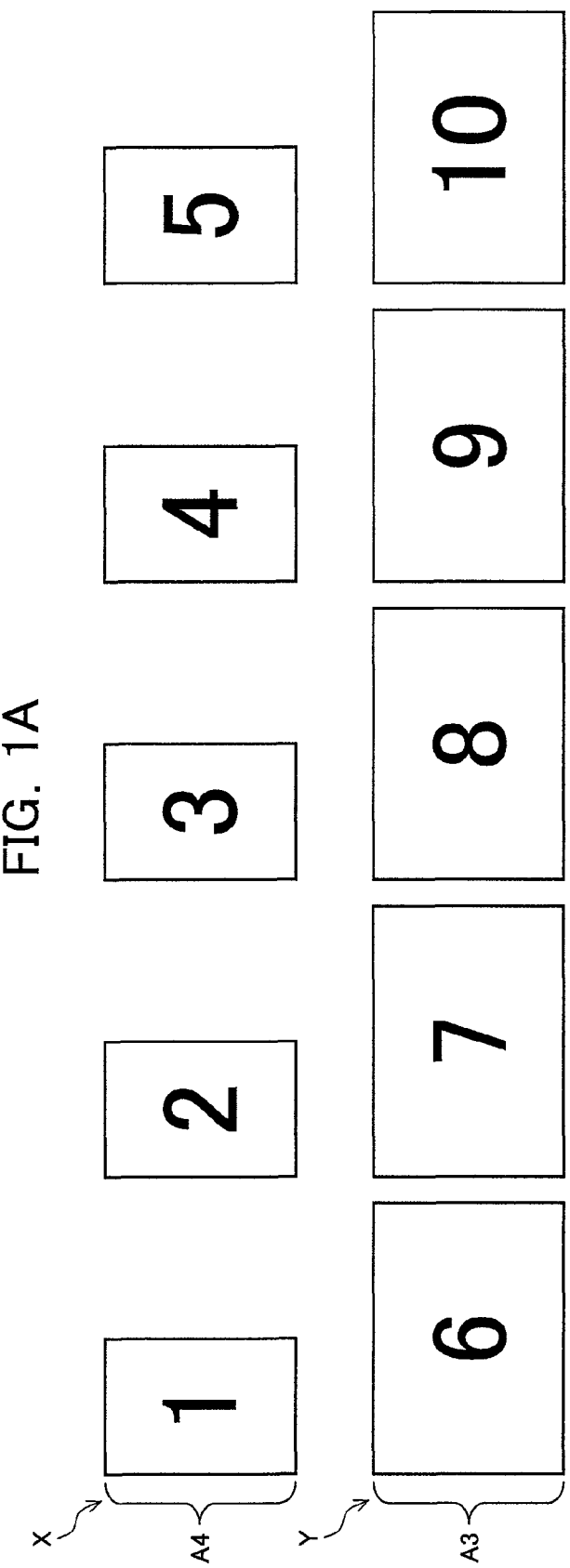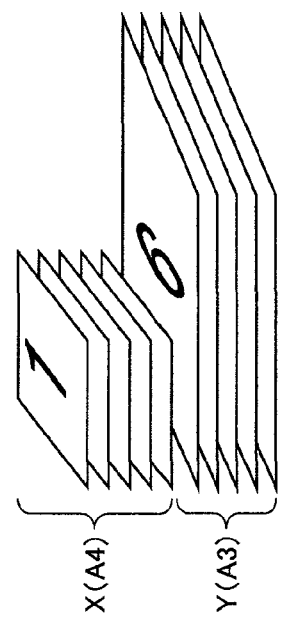
FIG. 1A
FIG. 1B

| IMAGE DATA NAME | PAPER SIZE |
|---|---|
| IMAGE DATA 1 | A4 |
| ⋮ | ⋮ |
| IMAGE DATA 5 | A4 |
| IMAGE DATA 6 | A3 |
| ⋮ | ⋮ |
| IMAGE DATA 10 | A3 |

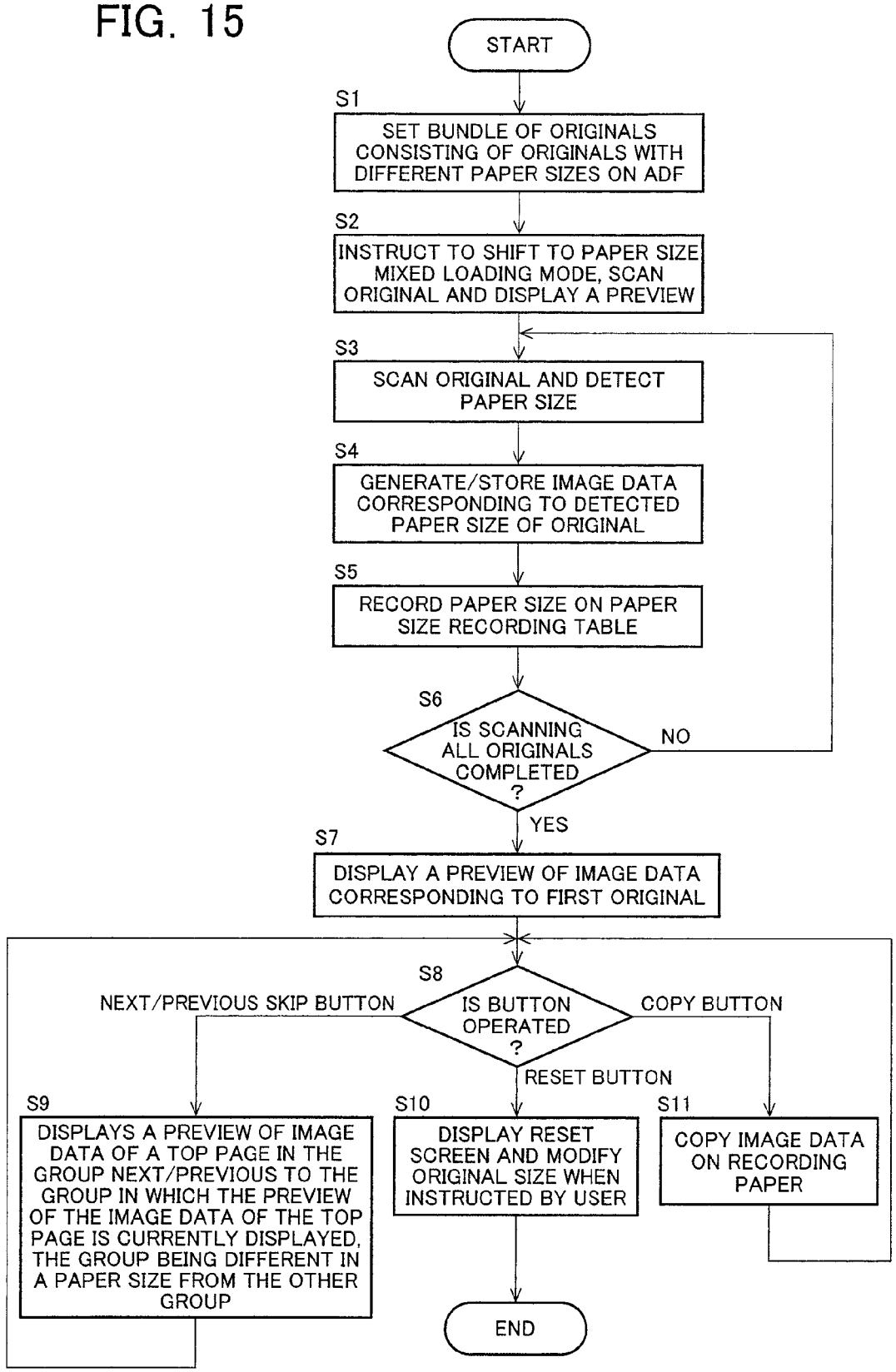

IMAGE FORMING APPARATUS

CROSS-NOTING PARAGRAPH

This non-provisional application claims priority under 35 U.S.C. §119(a) on Patent Application No. 2008-276513 filed in JAPAN on Oct. 28, 2008, the entire contents of which are hereby incorporated herein by reference.

FIELD OF THE INVENTION

The present invention relates to an image forming apparatus having a preview function and an original paper size automatic detection function, and more particularly, to an image forming apparatus that improves convenience in confirming whether original paper size detection is appropriately performed by using the preview function.

BACKGROUND OF THE INVENTION

Japanese Laid-Open Patent Publication No. 2006-311065 discloses a function of detecting an original paper size, and when the function is used, an original can be copied (printed) with a paper size corresponding to a detection result.

When the function is used, in a case where a bundle of originals in which original paper sizes are different, the bundle of originals is set on an Auto Document Feeder (ADF) and copying is instructed, a copy is automatically made in accordance with an original paper size.

However, when an image forming apparatus erroneously performs original paper size detection, for example, an original with a paper size of A4 is copied as an A3 original, and an A3 original is copied as an A4 original in some cases.

In such a case, a user is required to check all the obtained copies to confirm whether the paper size detection is correctly performed after copying a bundle of originals in which original paper sizes are different.

In a case where paper size detection has been erroneously performed for even one sheet in the bundle of originals in the above checking, it is necessary to make all the copies again, or pick up an erroneously detected original from the bundle of originals, make a copy again with a correct setting to replace the erroneously copied paper.

When a copy is made using an automatic detection function in this manner, a printing member such as copy paper or a toner is wasted in some cases, and additionally, time for making a copy again is wasted.

Meanwhile, an image forming apparatus having a so-called preview display function, for confirming by displaying a printing image (image data) on a display panel or the like before copying or printing has been proposed. The user, with the use of the preview display function, is able to confirm the printing image before making a copy to cut out the waste of the printing member or the trouble of making a copy again.

By the way, in the image forming apparatus having the preview display function, when an instruction of displaying a preview from a user is received, image data of a firstly scanned original is displayed. It is usual that the image data of the original is sequentially displayed sheet (one image data) by sheet thereafter by an instruction operation of the user.

Accordingly, in the case of scanning a bundle of originals consisting of 10 sheets of originals with the paper size of A4 and 10 sheets of A3 originals, and confirming whether or not the paper size detection of originals included in the bundle of originals is performed correctly, it is necessary to operate an instruction button (next display button) and display a preview of image data of the original sheet by sheet sequentially.

In the above example, the user needs to operate the instruction button 10 times for displaying the preview of aimed image data of the original in order to confirm whether or not the paper size detection is performed correctly on the 11th A3 original, however, such an operation is too troublesome for the user.

Meanwhile, in the case of confirming whether or not the paper size detection is performed correctly on the original, it is assumed that the user thinks that he/she may make a copy actually after displaying a preview of original image data immediately after (next) a detected original paper size has been switched, such as from A3 to A4, or original image data before (previous) or after (next) the original image data to confirm that the paper size detection is performed correctly.

SUMMARY OF THE INVENTION

An object of the present invention is, to provide an image forming apparatus having a preview function and an original paper size automatic detection function, wherein it is possible to display a preview of original image data immediately next a detected original paper size has been switched with a simple operation.

Another object of the present invention is to provide an image forming apparatus comprising: a detecting portion that detects a paper size of an original to be scanned; a paper size recording portion that, in accordance with image data of a scanned original, in order of the scanned original, records a paper size of the original; and a preview image display control portion that refers to the recorded detection result and displays a preview of image data of each top page in every group of image data having the same paper size.

Another object of the present invention is to provide the image forming apparatus, wherein the preview image display control portion, on receipt of a next/previous skip instruction operation, displays a preview of image data of a top page in the group next/previous to the group in which the preview of the image data of the top page is currently displayed, the group being different in a paper size from the other group.

Another object of the present invention is to provide the image forming apparatus, wherein the preview image display control portion, together with a preview display of image data, displays a paper size corresponding to the image data.

Another object of the present invention is to provide the image forming apparatus, wherein the preview image display control portion, in a case where a paper size of an original corresponding to image data displayed for previewing has been erroneously detected to be smaller than an actual paper size of an original corresponding to the image data, on receipt of a modification instruction operation from a user, displays a screen that guides such that an operation to input an appropriate paper size of an original and to rescan the original is performed.

Another object of the present invention is to provide the image forming apparatus, wherein the preview image display control portion, on receipt of a paper size input operation and a rescan instruction from a user, modifies a paper size, recorded in the paper size recording portion, corresponding to the image data displayed for previewing, into an input paper size, and stores image data of an original scanned again instead of image data corresponding to the preview display that has already been stored, and displays a preview again.

Another object of the present invention is to provide the image forming apparatus, wherein the preview image display control portion, in a case where a paper size of an original corresponding to image data displayed for previewing has been erroneously detected to be larger than an actual paper size of an original corresponding to the image data, on receipt of a modification instruction operation from a user, displays a screen that guides such that an operation to input an appropriate paper size of an original is performed.

Another object of the present invention is to provide the image forming apparatus, wherein the preview image display control portion, on receipt of a paper size input operation from a user, modifies a paper size that is recorded in the paper size recording portion and corresponds to the image data displayed for previewing, into an input paper size, and applies modification processing to image data, already stored, corresponding to the preview display, and displays a preview again.

BRIEF DESCRIPTION OF THE DRAWINGS

FIGS. 1A and 1B are diagrams for explaining an outline of an image forming apparatus according to the present invention.

FIG. 15 is a flowchart for explaining preview image display processing.

PREFERRED EMBODIMENTS OF THE INVENTION

Description will be given for an outline of an image forming apparatus according to the present invention using FIGS. 1A and 1B.

FIG. 1A is a diagram for showing a bundle of originals to be copied in which paper sizes are different.

X shows a bundle of A4 originals consisting of 5 sheets of originals with a paper size of A4, and Y shows a bundle of A3 originals consisting of 5 sheets of originals with the paper size of A3.

On a surface of a copy original, the number of sheets of originals ("1" to "10") is assumed to be described.

Here, when a user, as shown in FIG. 1B, sets the above originals on an ADF of the image forming apparatus according to the present invention and instructs the apparatus to scan and to display a preview, the original is scanned and at the same time a paper size of the original is detected so that image data is generated/recorded.

Additionally, the image data is recorded, and the detected original paper size is recorded.

Thereafter, a preview of image data "1" corresponding to a first original is displayed.

In conventional image forming apparatuses, whether or not an original paper size is correctly detected automatically is confirmed with a preview display by operating a next original display button 5 times so that a preview of image data "6" of an original included in a bundle of A3 originals (Y) is displayed.

However, in the image forming apparatus according to the present invention, by operating a next skip button once, a preview of the image data "6" can be immediately displayed.

Figure 2:
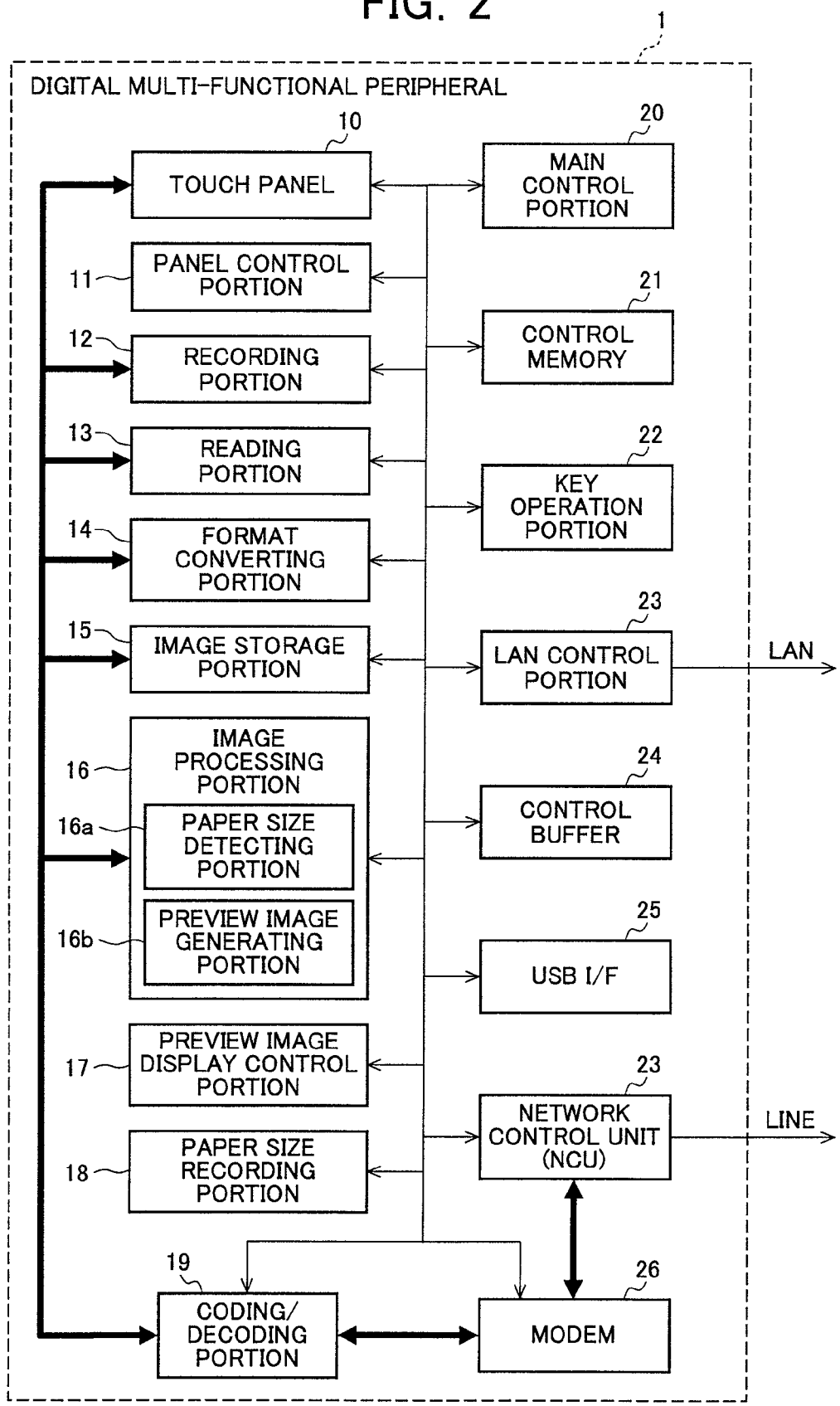
FIG. 2 is a schematic block diagram for showing an exemplary configuration of the image forming apparatus according to an embodiment of the present invention.
Figure 3:
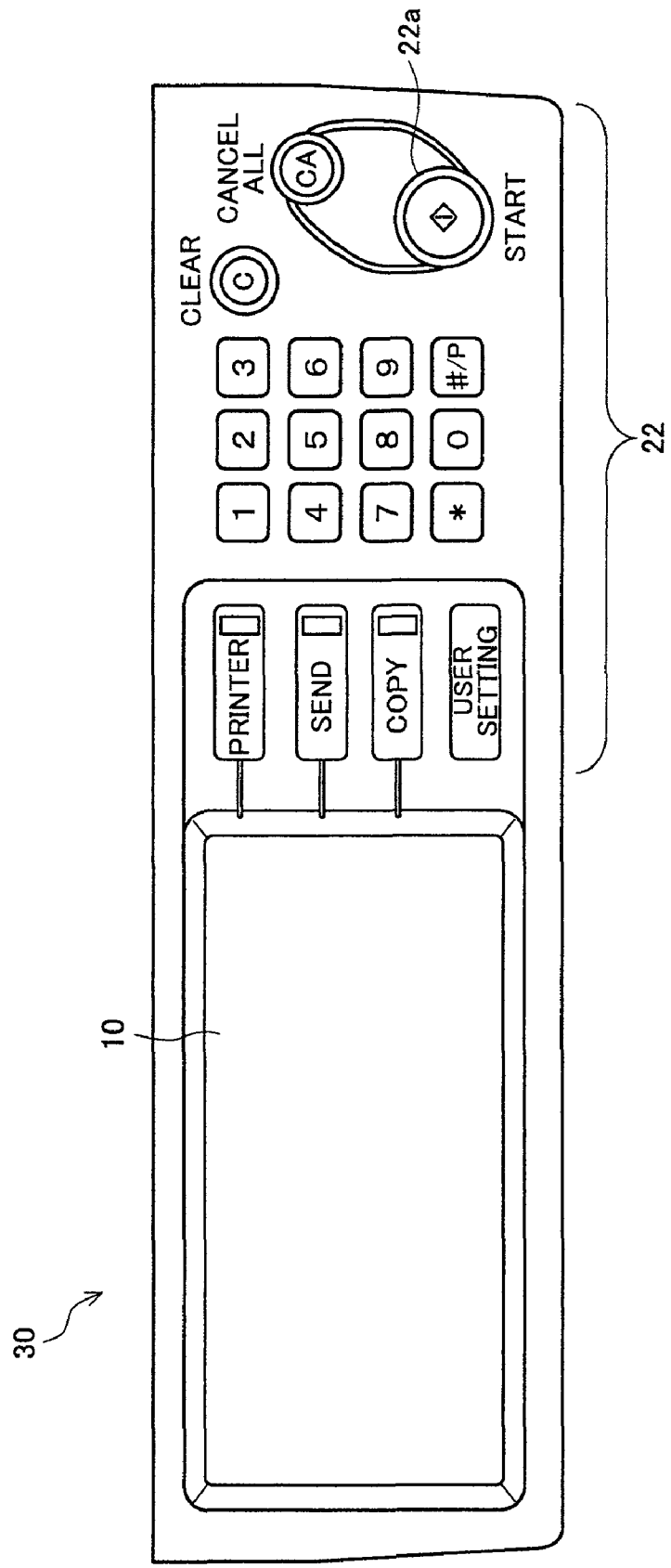
FIG. 3 is a diagram for showing an example of an operation panel.

FIG. 2 is a schematic block diagram for showing an exemplary configuration of the image forming apparatus according to an embodiment of the present invention, and the image forming apparatus in the illustrated example is configured as a digital multi-functional peripheral having a print function and a facsimile sending function, etc., to be used for a duplicating operation, or the like. FIG. 3 is an external view for showing an example of a touch panel and a key operation portion in the multi-functional peripheral of FIG. 2.

The image forming apparatus configured as a multi-functional peripheral (hereinafter, referred to as a digital multi-functional peripheral) 1 is provided with a touch panel 10, a panel control portion 11, a recording portion 12, a reading portion 13, a format converting portion 14, an image storage portion 15, an image processing portion 16, a preview image display control portion 17, a paper size recording portion 18, a coding/decoding portion 19, a main control portion 20, a control memory 21, a key operation portion 22, a LAN (Local Area Network) control portion 23, a control buffer 24, a network control unit (NCU) 25, and a modem 26.

The main control portion 20 is comprised of a CPU (Central Processing Unit) or the like, and the control memory 21 is comprised of a nonvolatile memory or the like, such as a ROM (Read Only Memory). A program (firmware) and various setting data are stored in the control memory 21 so as to be readable from the main control portion 20. Further, the control buffer 24 is comprised of a volatile memory such as a RAM (Random Access Memory).

The above-described program is a control program that is executed by the main control portion 20 such as a command for reading an original according to the present invention, a command for generating and displaying a preview image, a command for generating/sending/receiving a facsimile image and an electronic mail, etc., and a command for printing. This program is extracted by the main control portion 20 on the control buffer and is executed by referring to various setting data appropriately with the control buffer 24 as a data area for temporal saving (working).

The reading portion 13 is provided with an Auto Document Feeder (ADF) that feeds originals mounted on an original mounting table (not shown) sheet by sheet, and images of the originals fed by the ADF can be read page by page by using a CCD (Charge Coupled Device) or the like, and the read image data of RGB (R: Red, G: Green, and B: Blue) is output to the image processing portion 16. Additionally, the reading portion 13 is provided with a counter (not shown) and which page of the original is being read or the total number of pages of the original can be counted by using the counter, a paper detecting censor of the ADF, or the like.

The image processing portion 16 is provided with a paper size detecting portion 16a for detecting a paper size of an original to be scanned.

There are various detection methods proposed, and as an example, an original paper size may be detected by measuring scanning time of longitudinal/lateral width of an original to be scanned.

Additionally, the image processing portion 16 outputs, per image data of the scanned original, information having a paper size (A3, A4, or the like) of the original corresponding to the image data detected by the paper size detecting portion 16a to the paper size recording portion 18. Note that, details of the paper size recording portion 18 will be described below.

Furthermore, the image processing portion 16 is provided with a preview image generating portion 16b. The preview image generating portion 16b, for example, performs various image adjustment processing (image processing for displaying a preview) to image data stored in the image storage portion 15 based on a set output condition, and generates a preview image. The image processing for displaying a preview includes color correction processing to convert image data based on display characteristics of the touch panel 10, image enlarging/reducing processing in accordance with a printing copy ratio, or the like.

In addition, the preview image generating portion 16b outputs a generated preview image to the image storage portion 15. The preview image stored in the image storage portion 15 is displayed on the touch panel 10 on receipt of a control of the preview image display control portion 17.

Note that, the image processing portion 16 performs various image processing to the image data to be processed. For example, image processing in reading an original including A/D conversion, etc., to the RGB image data from the reading portion 13 is performed (original image processing). The image data after subjected to the original image processing is stored in the image storage portion 15. The image processing portion 16 performs, in printing of the image data stored in the image storage portion 15 or sending (outputting) thereof to an external apparatus, based on the set output condition (such as an output condition relating to a printing copy ratio or setting information of, so-called N-up printing) etc., image processing for printing or image processing for fax sending to the image data. The image processing for printing or image processing for fax sending includes image quality adjustment processing, etc., in accordance with an output form. Note that, the set output condition is stored in the control memory 21.

The preview image display control portion 17 refers to a detection result recorded in the paper size recording portion 18 and displays a preview of image data of each top page in a group of image data having an identical paper size.

The format converting portion 14 converts read image data or image data received from outside into a predetermined file format such as a PDF (Portable Document Format).

The recording portion 12 is provided with a printer apparatus that employs a printing system such as an electrophotographic system, and records (that is, prints) image data and the like stored in the image storage portion 15 on recording paper. For example, recording is performed based on image data subjected to image processing for printing.

The image storage portion 15 is comprised of a hard disc or the like, and stores image data that has been passed from the reading portion 13 through the image processing portion 16 or the like, for each original page.

The coding/decoding portion 19 compresses image data by coding and decodes (expands) the coded image data to original image data. For example, the coding/decoding portion 19 performs coding of image data read from an original, decoding of the coded data, decoding of coded image data received from outside, and the like. In the coding/decoding portion 19, coding system corresponding to purposes is usable, including JPEG (Joint Photographic Experts Group) that is generally used in filing.

The modem 26 is comprised of a facsimile modem capable of facsimile communication, and is connected to a telephone line and is directly connected to the NCU 25. The NCU 25 connects the modem 26 to the public switched telephone network as the occasion demands. Such a configuration makes it possible to send image data stored in the image storage portion 15 to outside by facsimile or the like.

The LAN control portion 23 is connected to a LAN and performs communication of electronic mail data and communication of internet facsimile (internet FAX) via an internet.

The touch panel 10 or the key operation portion 22 of FIG. 3 receives an operation for selecting desired processing out of processing of reading an original, processing of printing, etc., an operation for starting the processing, an operation for performing a setting that is necessary when each processing is executed (a selecting operation or an inputting operation), and the like. The touch panel 10 and the key operation portion 22 may be configured as an operation panel 30 as illustrated in FIG. 3. The key operation portion 22 is provided with a key group which is necessary for operation such as a start key 22a for receiving instructions of start of original reading or the like.

The touch panel 10 is provided with a display portion such as a liquid crystal display and an operation reception portion such as a touch sensor. In the touch panel 10, the display control and the operation reception control are performed by the panel control portion 11.

The panel control portion 11 performs display control of the display portion and operation reception control of the operation reception portion in the touch panel 10.

The display on the touch panel 10 is realized by the panel control portion 11 controlling so that a GUI (Graphical User Interface) image/preview image is displayed. Each GUI/preview image may be stored in an internal memory or the control memory 21 of the panel control portion 11 so as to be readable.

Description will hereinafter be given in detail for preview display processing of the present invention. First, a user sets a bundle of originals consisting of 5 sheets of originals with a paper size of A4 and 5 sheets of originals with a paper size of A3 illustrated in FIG. 1A, on the ADF of the digital multi-functional peripheral 1 (see FIG. 1B).

Figures 4, 5:
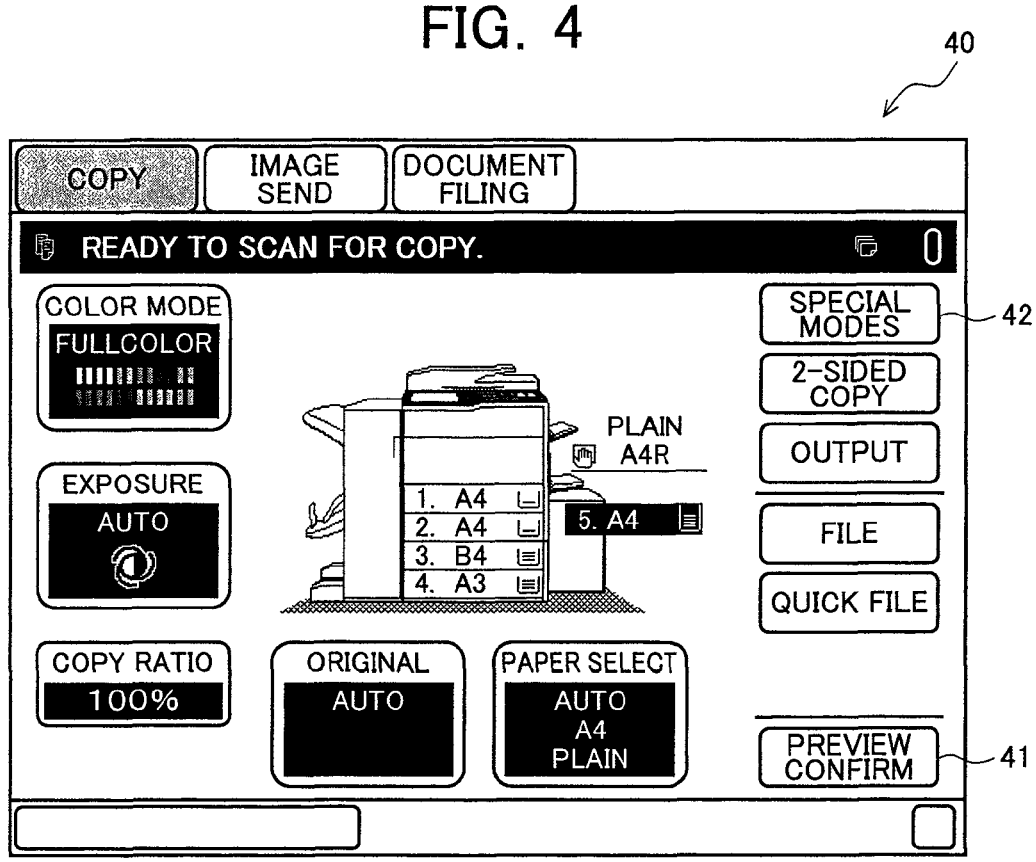
FIG. 4 is a diagram for showing an example of a GUI image to be displayed as a standard screen on a touch panel.
FIG. 5 is a diagram for showing an example of a paper size recording table.

Then, the digital multi-functional peripheral 1 detects original setting by the user and displays a standard screen of the digital multi-functional peripheral 1 of FIG. 4, on a touch panel 10. FIG. 4 shows an example of a GUI image (referred to as a GUI image 40) that is displayed on the touch panel 10 as the standard screen. The GUI image 40 is displayed on the touch panel 10 when an original is set on the ADF and a power source of the digital multi-functional peripheral 1 is turned on/reset. The GUI image 40 shows a state where a copy mode is selected.

Various condition settings when making a copy are possible in the GUI image 40, and a print condition set through a key that is displayed in the GUI image 40, is stored in a control memory 21 when original reading is started and applied to the entire originals.

In the GUI image 40, a preview confirm button 41 for displaying a preview of an original read by a reading portion 13 is also displayed.

Here, the user operates a special modes button 42 and sets an original paper automatic detection mode (paper size mixed loading mode). Note that, in the paper size mixed loading mode, the recording portion 12 makes a copy with an original paper size detected by the paper size detecting portion 16a.

Furthermore, for instructing the digital multi-functional peripheral 1 to scan the originals and display a preview thereafter, the preview confirm button 41 is set to be turned ON for inversion and a start key 22a (see FIG. 3) to start a copy is depressed, then the paper size detecting portion 16a detects an original paper size, and image data of the originals is sequentially generated by the reading portion 13 of the digital multi-functional peripheral 1, is subjected to various image processings by an image processing portion 16, and is stored in an image storage portion 15.

At the same time, the detecting portion 16a outputs the detected original paper size to a paper size recording portion 18.

The paper size recording portion 18 that has received the paper size, records the paper size of the original, in accordance with image data of a scanned original, in order of the scanned original, in a table format, for example.

FIG. 5 shows an example of a paper size recording table 101 that is recorded by the paper size recording portion 18 in a case where the bundle of originals illustrated in FIGS. 1A and 1B is scanned.

101a is a column for the name of image data where the names of image data of the originals are recorded in order of being scanned.

101b is a column for the paper size where the paper size of the original corresponding to the image data is recorded in accordance with image data.

In the paper size recording table 101, as an image data group (unit) of an original detected that the paper size is A4, image data "1" to image data "5" are recorded, and as an image data group of an original detected that the paper size is A3, image data "6" to image data "10" are recorded.

At the same time, a preview image for displaying a preview is generated by a preview image generating portion 16b and stored in the image storage portion 15.

When the above processing is completed, a preview image display control portion 17 displays a preview of image data corresponding to the firstly scanned original. Here, a preview image $50_1$ is displayed on the touch panel 10.

$51x$ is a preview image of the image data "1" corresponding to an original of a top page in the bundle X of originals with a paper size of A4.

Additionally, the display control portion 17 displays a preview of image data together with a paper size (A4/A3) corresponding to the image data, and a preview of the image data is displayed based on the paper size.

52 is a next original display button (described hereinafter as a next button), 53 is a next skip button, 54 is a fast next skip button, 55 is a previous original display button (described hereinafter as a previous button), 56 is a previous skip button, 57 is a fast previous skip button, 58 is a reset button, and 59 is a copy start button, and the function of each button will be described below.

On receipt of the operation of the next skip button 53 (next skip instruction operation) by the user, the preview image display control portion 17 refers to the paper size recording table 101 of FIG. 5 and displays a preview of image data of a top page in the group (unit) next to the group in which the preview of the image data of the top page is currently displayed, the group being different in a paper size from the other group.

Figure 6:
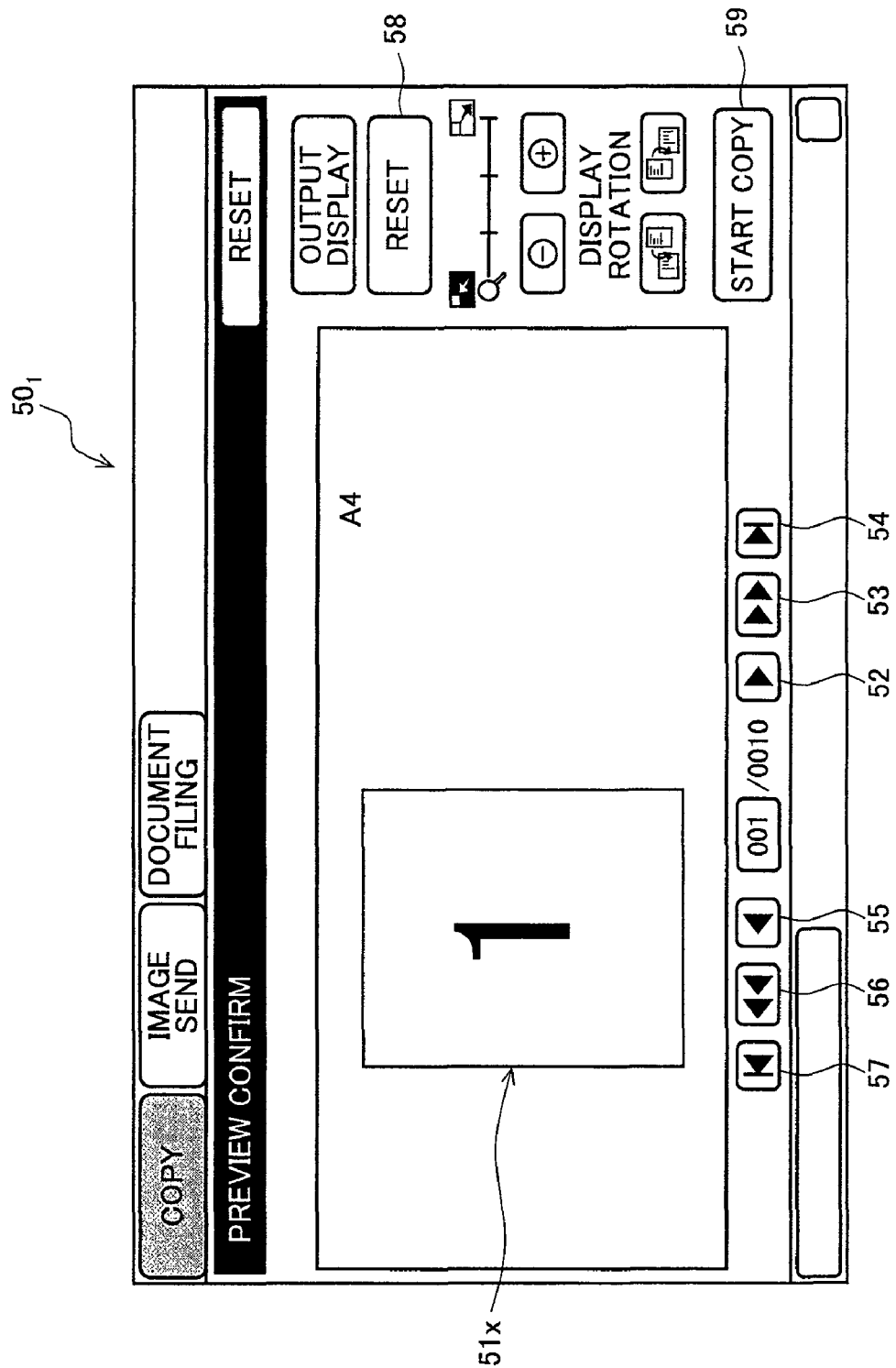
FIG. 6 is a diagram for showing an example of a preview image.

In the examples of FIGS. 1A, 1B and 5, since a paper size of image data being displayed for previewing (image data "1" of FIG. 5) in a preview image $50_1$ of FIG. 6 is A4, an image data group having a paper size (A3), next (immediately next) to the image data, different from the paper size is image data "6" to image data "10" of FIG. 5.

Figure 7:
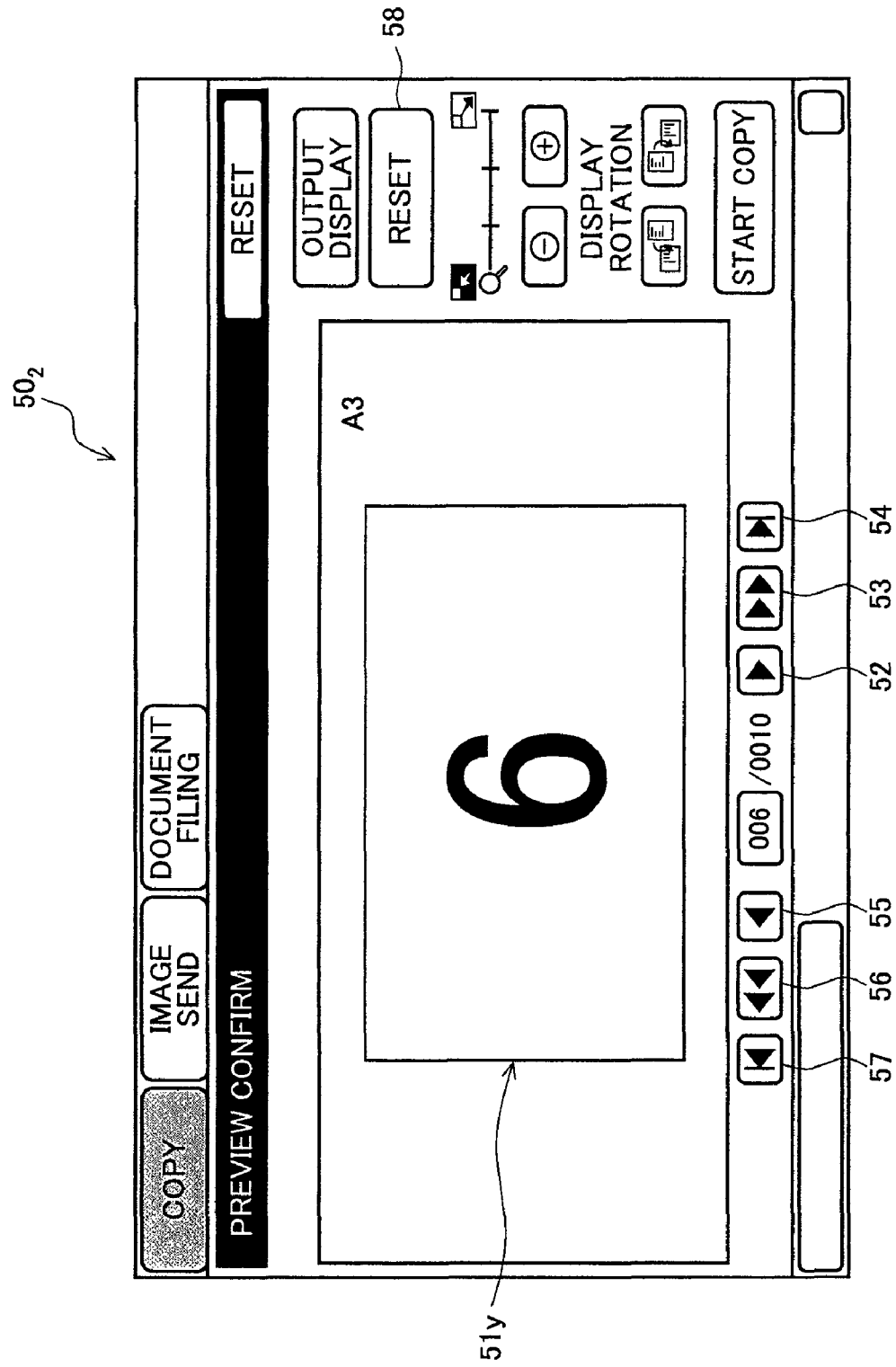
FIG. 7 is a diagram for showing another example of a preview image.

Since image data of a top page in the image data group is the image data "6", the preview image display control portion 17 displays a preview image $50_2$ shown in FIG. 7, for example, on a touch panel 10.

$51y$ is a preview image of the image data "6" corresponding to an original of the top page on the bundle of originals Y with a paper size of A3.

Figure 8:
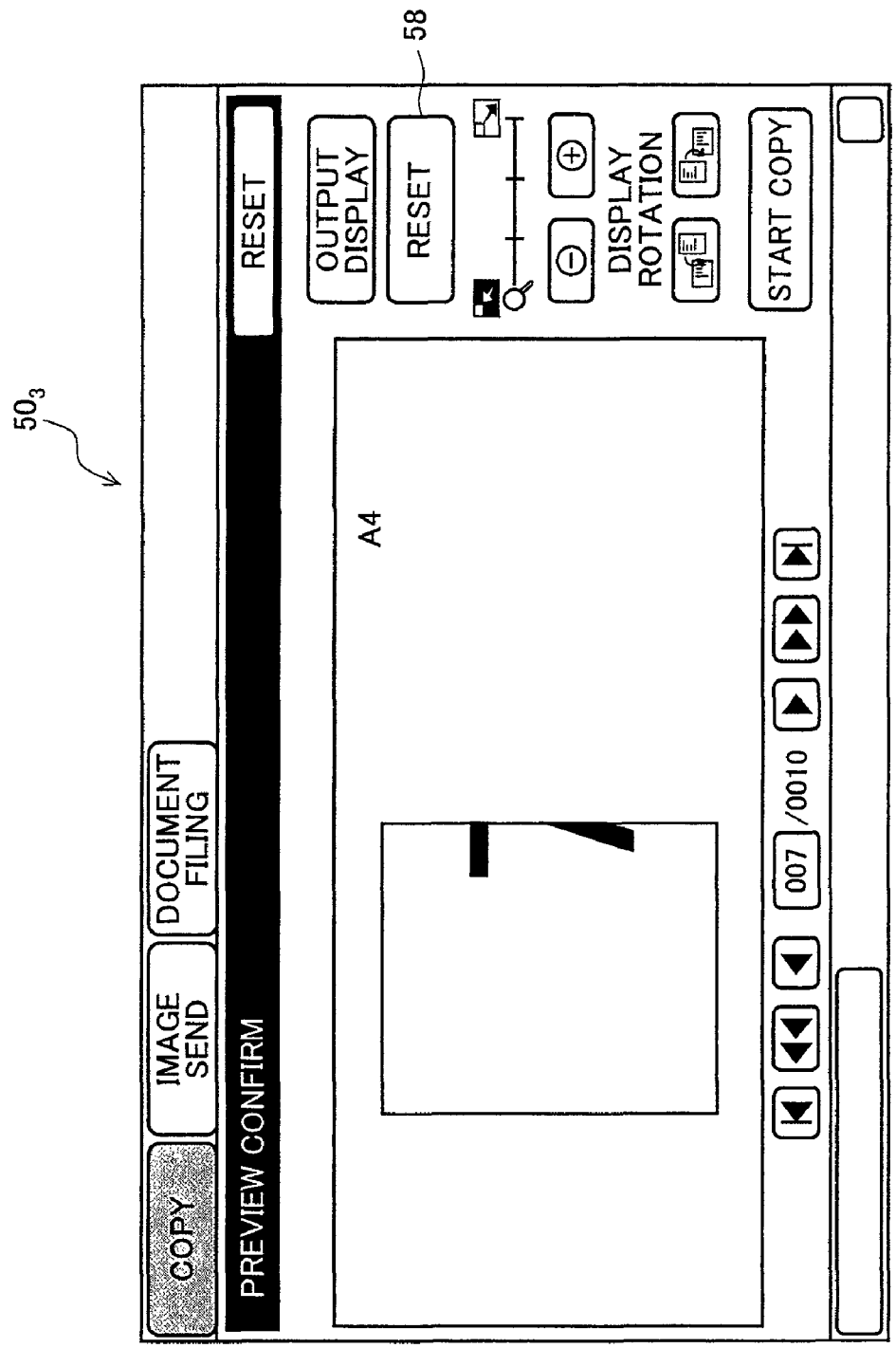
FIG. 8 is a diagram for showing another example of a preview image.

Here, when the user operates a next button 52, the preview image display control portion 17 displays a preview image of image data "7" that is image data next to image data being displayed for previewing (image data "6"), for example, a preview image $50_3$ shown in FIG. 8.

Here, a paper size of an original corresponding to the image data "7" is A3, however, is assumed to be erroneously detected as A4. Note that, a paper size of the paper size recording table 101 is assumed to be set to A4 similarly.

Figure 9:
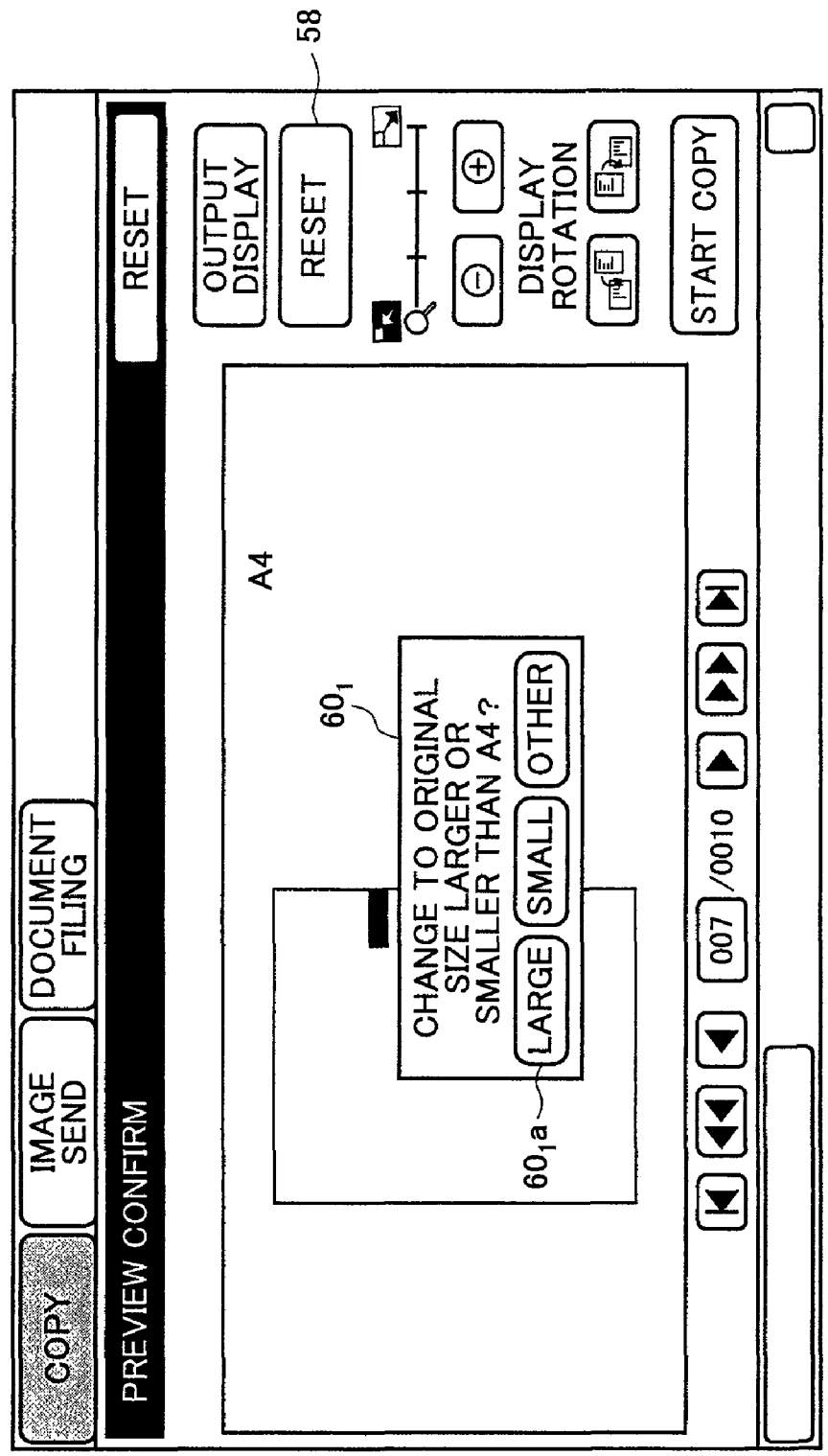
FIG. 9 is a diagram for showing an example of a reset screen.

In a case where a paper size of an original corresponding to image data displayed for previewing has been erroneously detected to be smaller than an actual paper size of an original corresponding to the image data, when the user operates a reset button 58, the preview image display control portion 17 displays a reset screen $60_1$ shown in FIG. 9.

Figure 10:
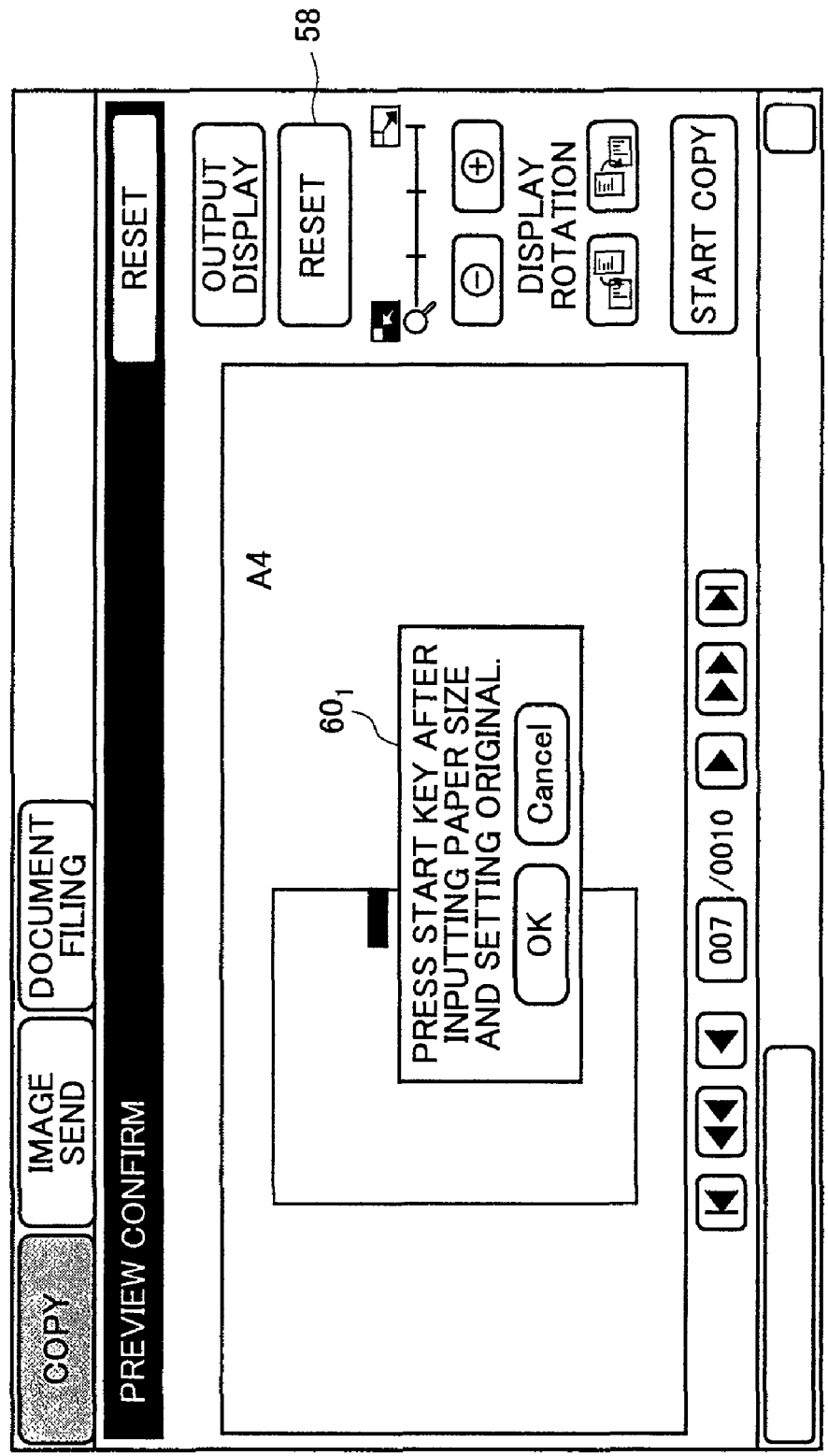
FIG. 10 is a diagram for showing an example of a guidance screen.

When the user operates a large button $60_1a$ on a reset screen 60 (a modification instruction operation from the user), the display control portion 17, on receipt of the operation, displays a guidance screen $61_1$ shown in FIG. 10, so as to guide the user to input an appropriate paper size of an original and perform an instruction operation to rescan the original.

The user sets an original "7" on an ADF, specifies (inputs) A3 as a paper size, and operates a start key 22a (a paper size input operation and a rescan instruction operation from the user) according to the guidance screen $61_1$.

Then, the preview image display control portion 17, receives the operation, stores image data of the rescanned original "7" in stead of the image data corresponding to the preview display, already stored in the image storage portion 15, and displays a preview again.

Additionally, as well as the storage of image data, the display control portion 17 modifies a paper size (A4) corresponding to the image data displayed for previewing in the paper size recording table 101 to an input paper size (A3).

Figure 11:
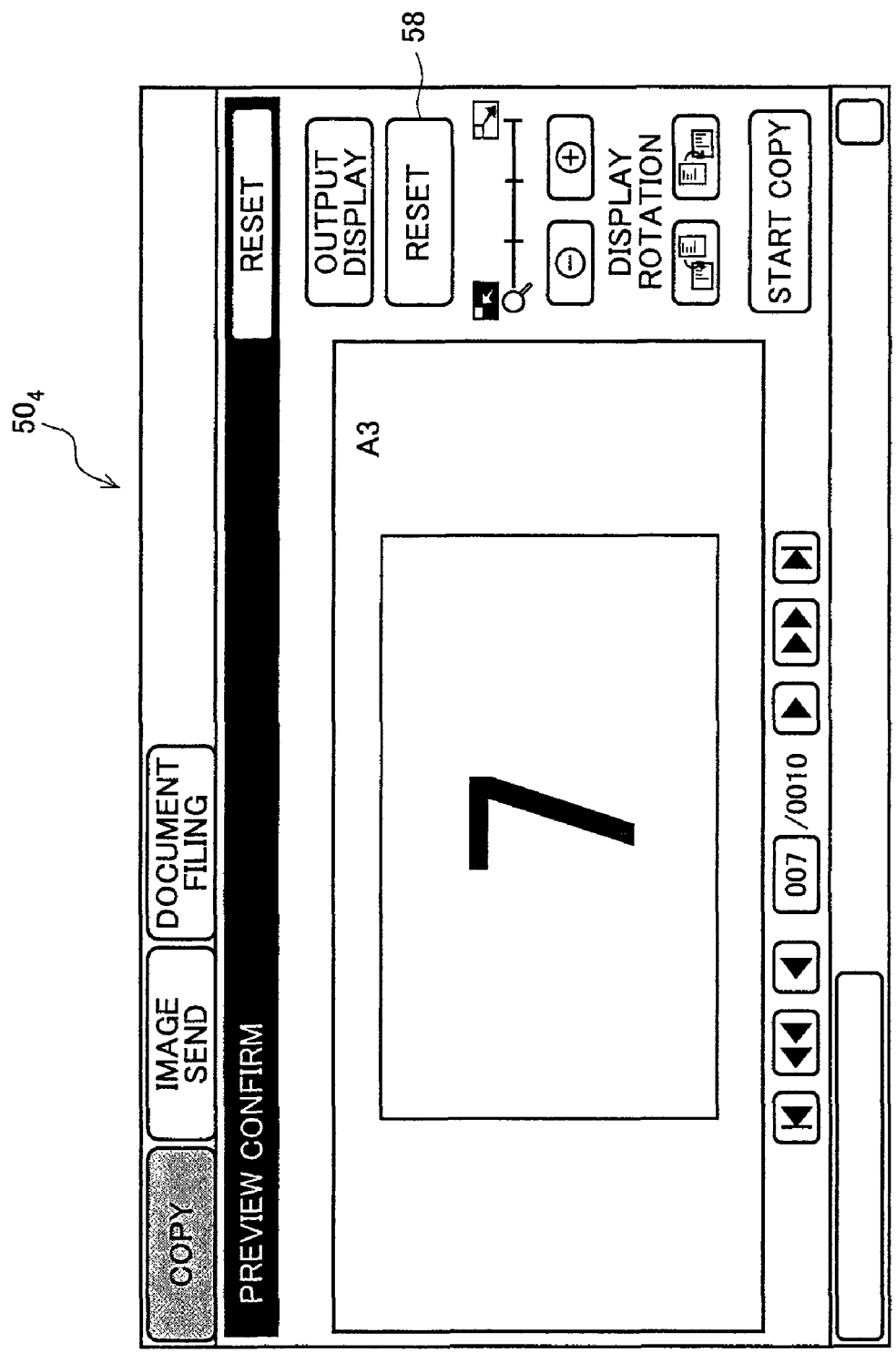
FIG. 11 is a diagram for showing another example of a preview image.

Then, the preview image display control portion 17, displays a preview image $50_4$ corresponding to the image data, as shown in FIG. 11.

Figure 12:
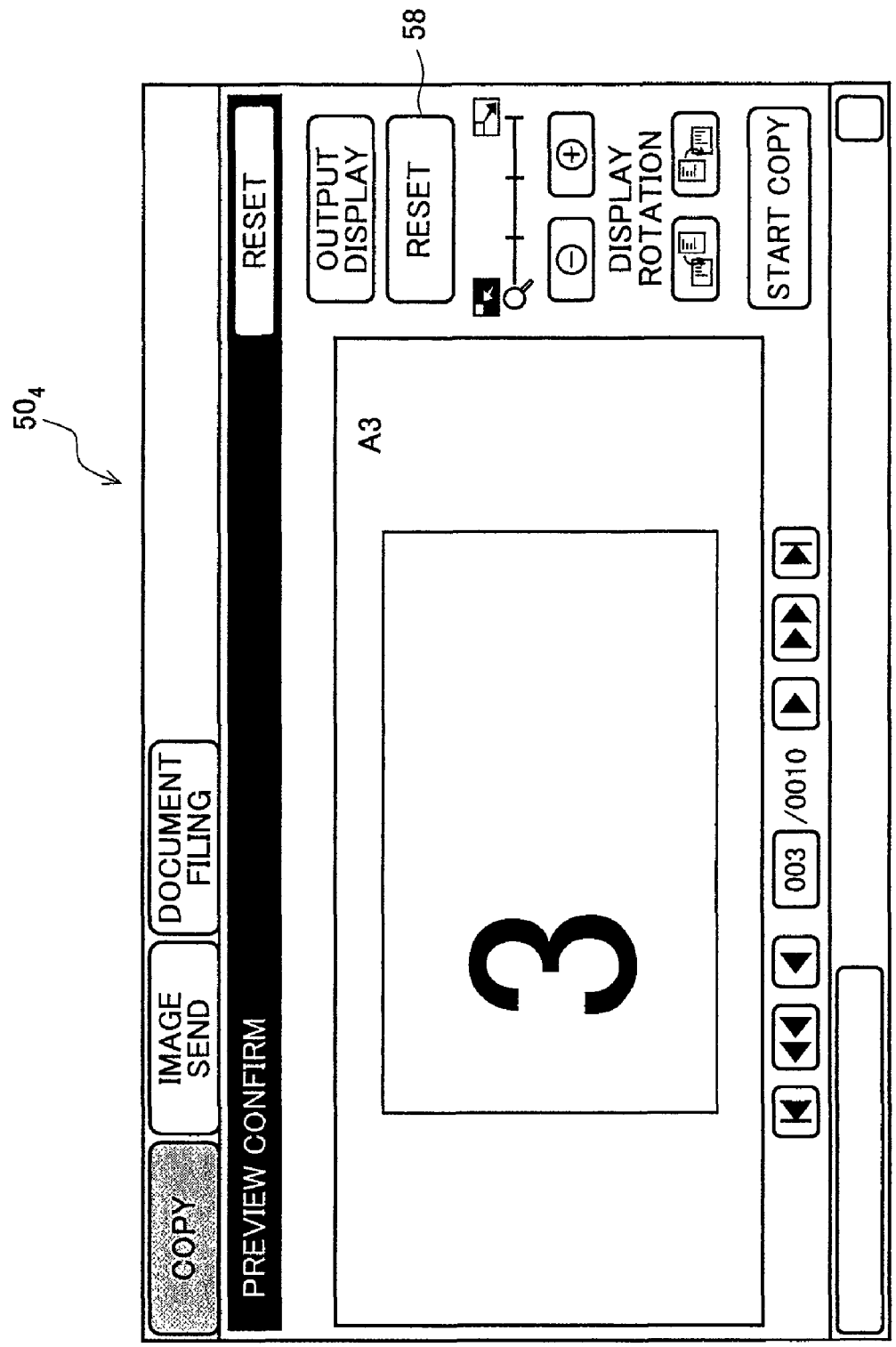
FIG. 12 is a diagram for showing another example of a preview image.
Figure 13:
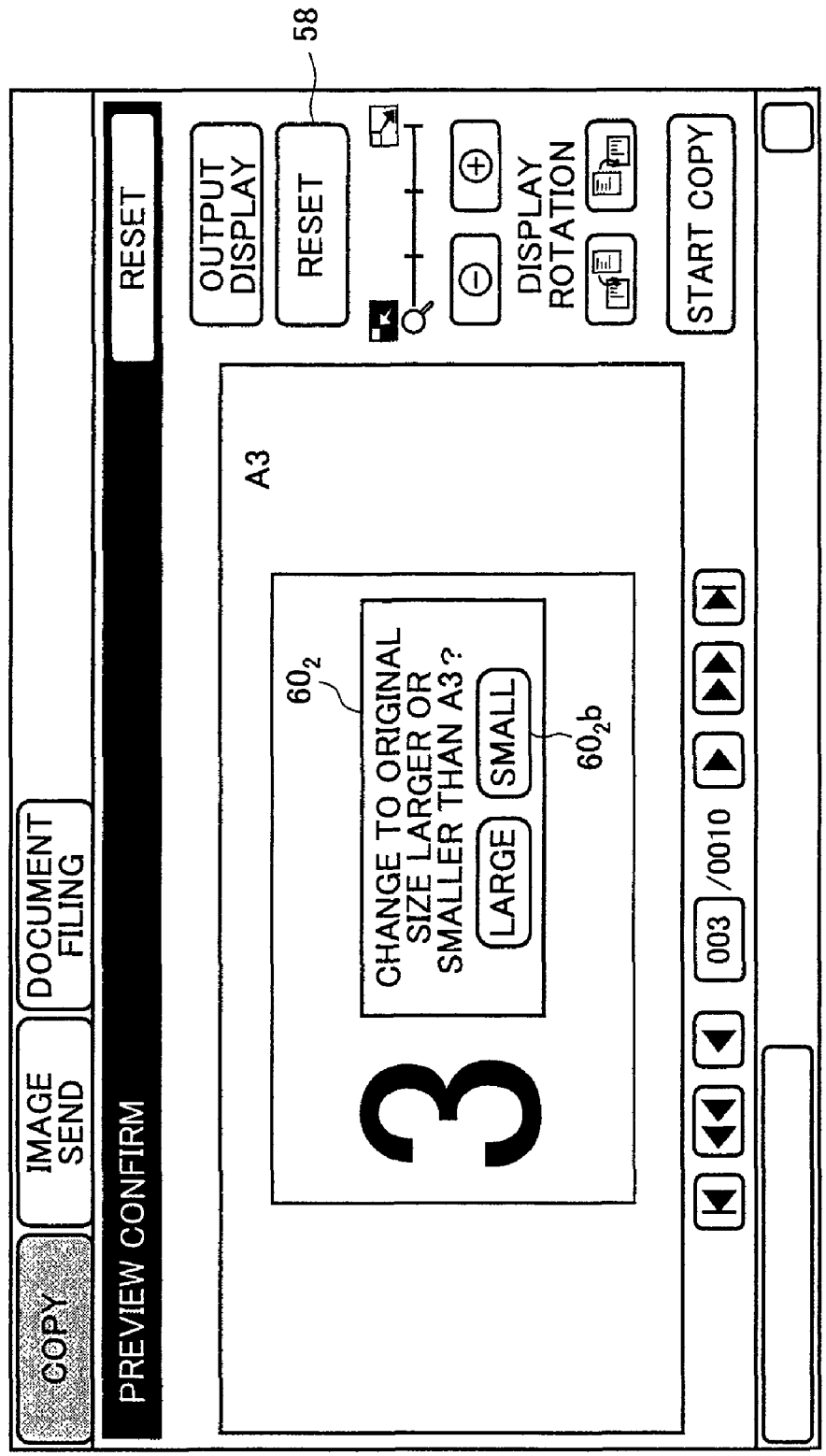
FIG. 13 is a diagram for showing another example of a reset screen.

Additionally, in a case where a paper size of an original corresponding to image data displayed for previewing has been erroneously detected to be larger than an actual paper size of an original corresponding to the image data as shown in the preview image $50_4$ of FIG. 12, when the user operates the reset button 58, the preview image display control portion 17 displays a reset screen $60_2$ shown in FIG. 13.

Figure 14:
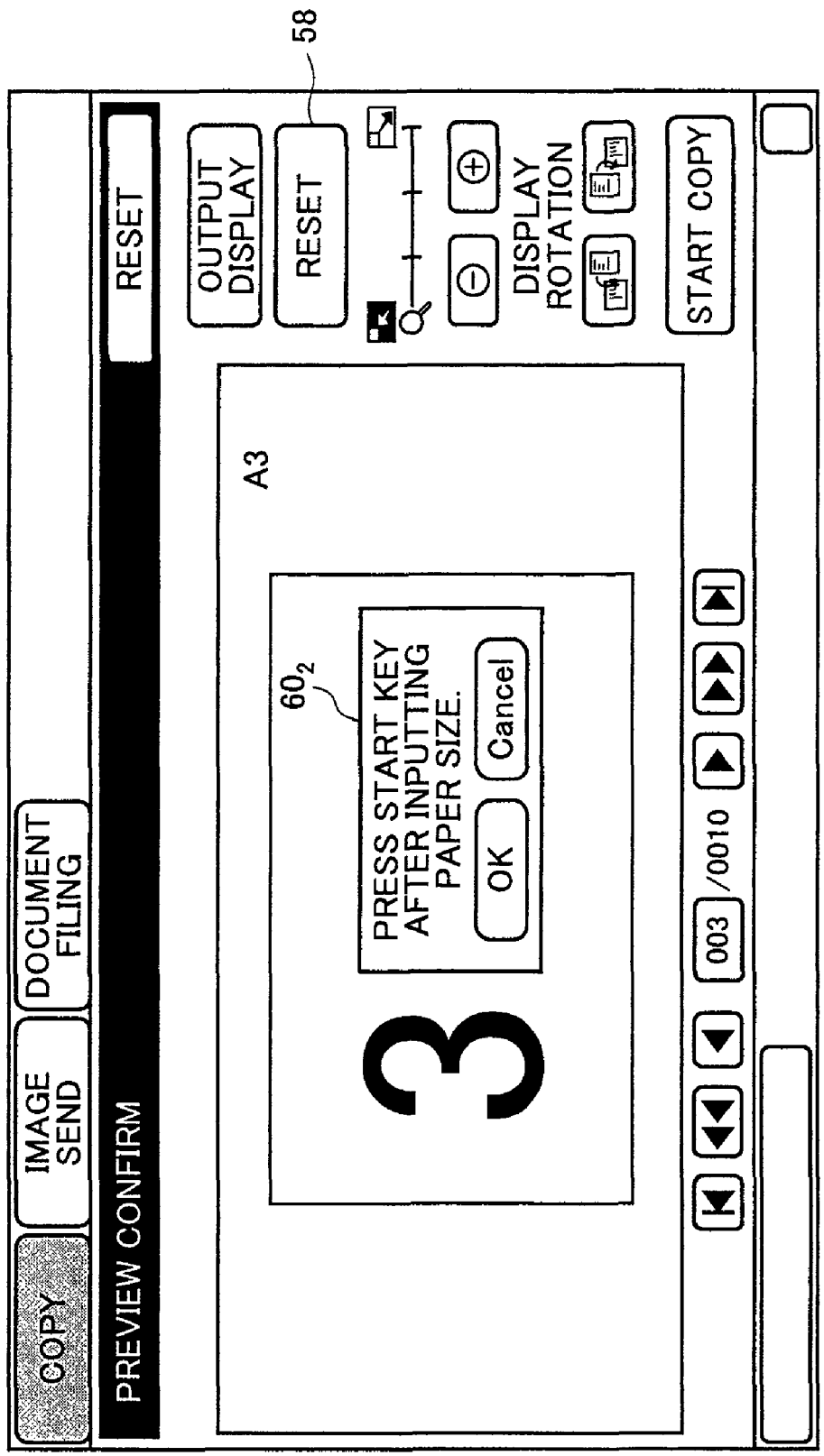
FIG. 14 is a diagram for showing another example of a guidance screen.

When the user operates a small button $60_2b$ on a reset screen $60_2$ (a modification instruction operation from the user), the display control portion 17, receives the operation, displays a guidance screen $61_2$ shown in FIG. 14, so as to guide the user to perform to input an appropriate paper size of an original.

The user specifies A4 as a paper size, and operates the start key 22a (a paper size input operation from the user) according to the guidance screen $61_2$.

Then, the preview image display control portion 17, receives the operation, applies modification processing on the image data corresponding to the preview display that has already stored in the image storage portion 15, and displays a preview again.

Specifically, when the preview image display control portion 17 instructs an image processing portion 16 to perform the modification processing, the image processing portion 16 applies image processing for deleting right half of image data "3" stored in the image storage portion 15.

Additionally, as well as the image processing, the display control portion 17 modifies a paper size (A3) corresponding to the image data displayed for previewing in the paper size recording table 101 to an input paper size (A4).

Then, the preview image display control portion 17 displays a preview of the image data to which the modification processing has been applied.

Here, description will be given for functions of other operation buttons.

When a previous button 55 is operated in the preview image $50_2$ shown in FIG. 7, the preview image display control portion 17 displays a preview image of image data "5" that is the image data previous to image data being displayed for previewing.

Alternatively, on receipt of an operation of a previous skip button 56 (previous skip instruction operation) by the user in the preview image $50_2$, the preview image display control portion 17 displays a preview of image data of a top page in the group previous (immediately previous) to the group in which the preview of the image data of the top page is currently displayed, the group being different in a paper size from the other group.

In the above example, the preview image $50_1$ of FIG. 6 is displayed.

Additionally, when the user operates a fast next skip button 54 in the preview image $50_1$ of FIG. 6, the preview image display control portion 17 refers to the paper size recording table 101 and displays a preview of the first or the last image data (image data "6" or image data "10") in a trailing image data group in the table 101.

Alternatively, when the user operates a fast previous skip button 57 in the preview image $50_2$ shown in FIG. 7, the preview image display control portion 17 refers to the paper size recording table 101 and displays a preview of the first or the last image data (image data "1" or image data "5") in an image data group of a top page in the table 101.

The preview display by these fast skip buttons (54, 57) are convenient for a user in a case where there is an erroneously detected original as described above, especially in a case where there are erroneously detected originals at intervals.

When the user displays each preview image by button operation described above, confirms whether paper size detection is performed appropriately, and operates a copy start button 59, a recording portion 12 prints (copies) image data "1" to image data "10" recorded in an image storage portion 15 on recording paper.

Note that, as well as copying, the image data "1" to the image data "10" stored in the image storage portion 15 may be subjected to file conversion to PDF and the like by a format converting portion 14 and stored in the image storage portion 15.

Alternatively, the data may be attached to an electronic mail or sent to a predetermined destination using internet FAX.

Next, description will be given for the above preview image display processing using a flowchart of FIG. 15.

A user sets a bundle of original consisting of originals with different paper sizes on an ADF of the digital multi-functional peripheral 1 (step S1), and instructs the digital multi-functional peripheral 1 through the touch panel 10 to shift to a paper size mixed loading mode and to display a preview after scanning the original (step S2).

The reading portion 13 of the instructed digital multi-functional peripheral 1 scans the original sequentially, and the paper size detecting portion 16a detects a paper size of the original (step S3). Then, the reading portion 13 generates image data corresponding to a detected paper size of the original and stores the image data in the image storage portion 15 (step S4).

Additionally, the paper size recording portion 18 stores the paper size of the image data in the paper size recording table 101 (step S5).

When processing from step S3 to step S5 is repeated (in the case of NO at step S6), and scanning of all the originals are completed (in the case of YES at step S6), the preview image display control portion 17, as shown in the preview image $50_1$ of FIG. 6, displays a preview of image data corresponding to a firstly scanned original (step S7).

When the user operates the next skip button 53 (step S8/next skip button), the preview image display control portion 17 refers to the paper size recording table 101 and displays a preview of image data of a top page in the group next to the group in which the preview of the image data of the top page is currently displayed, the group being different in a paper size from the other group (step S9). Note that, in a case where the previous skip button 56 is operated, a preview image data of a top page in the group previous to the group in which the preview of the image data of the top page is currently displayed, the group being different in a paper size from the other group, is displayed.

When the user operates the reset button 58 (step S8/reset button), the preview image display control portion 17 displays the reset screen 60, and thereafter, modification processing of a paper size is executed by the image processing portion 16 and the like (step S10).

Note that, in a case where the next original display button 52, the fast next skip button 54, previous button 55, previous skip button 57 are operated, a preview image corresponding to each button is displayed.

When the user operates the copy start button 59, the recording portion 12 prints (copies) image data stored in the image storage portion 15 on recording paper (step S11).

Thus, since it is possible to display a preview of original image data immediately next a paper size has been switched only by operating the next skip button 53/previous skip button 56 once, convenience for the user is improved.

Additionally, since an erroneously detected paper size is modified and a preview of a modification result can be displayed with a simple operation, in the case of being erroneously detected, so that convenience for the user is improved.

Note that, for example, in a case where a previous skip button 56 is operated when a preview of image data "2" is displayed, an image data of a top page in the group previous to the group in which the preview of the image data of the page is currently displayed, the group being different in a paper size from the other group, does not exist. Then, top image data in every group of image data having the same paper size including the image data "2", that is, image data "1" may be displayed for previewing.

Alternatively, in a case where a next skip button 53 is operated when image data "7" is displayed for previewing, as above, top image data in every group of image data having the same paper size including the image data "7", that is, the image data "6" may be displayed for previewing.

Note that, although A3 and A4 are illustrated as paper sizes of an original in this embodiment, other than that, various paper sizes are usable. Additionally, a paper size of user setting, other than a fixed paper size, is usable.

According to the present invention, the following effect will be obtained.

In an image forming apparatus having a preview function and an original paper size automatic detection function, it is possible to display a preview of original image data immediately next a detected original paper size has been switched with a simple operation, and to improve convenience for a user.

The invention claimed is:

1. An image forming apparatus comprising:
   a display portion;
   a reading portion that transfers an original sheet by sheet and reads images of the original page by page;
   a detecting portion that detects a paper size of an original scanned by the reading portion;
   a paper size recording portion that, in accordance with image data of an original scanned by the reading portion, in order of the scanned original, records a paper size of the original; and
   a preview image display control portion that refers to a paper size of the original recorded by the paper size recording portion, distinguishes a top page of each of image data groups indicating the same paper size, and displays a preview of image data of each top page in every group of image data having the same paper size,
   wherein the preview image display control portion, on receipt of a next/previous skip instruction operation, displays a preview of image data of a top page in the group next/previous to the group in which the preview of the image data of the top page is currently displayed, the group being different in a paper size from the other group.

2. The image forming apparatus as defined in claim 1, wherein
   the preview image display control portion, together with a preview display of image data, displays a paper size corresponding to the image data.

3. The image forming apparatus as defined in claim 2, wherein
   the preview image display control portion, in a case where a paper size of an original corresponding to image data displayed for previewing has been erroneously detected to be smaller than an actual paper size of an original corresponding to the image data, on receipt of a modification instruction operation from a user, displays a screen that guides such that an operation to input an appropriate paper size of an original and to rescan the original is performed.

4. The image forming apparatus as defined in claim 3, wherein
   the preview image display control portion, on receipt of a paper size input operation and a rescan instruction from a user, modifies a paper size, recorded in the paper size recording portion, corresponding to the image data displayed for previewing, into an input paper size, and stores image data of an original scanned again instead of image data corresponding to the preview display that has already been stored, and displays a preview again.

5. The image forming apparatus as defined in claim 2, wherein
   the preview image display control portion, in a case where a paper size of an original corresponding to image data displayed for previewing has been erroneously detected to be larger than an actual paper size of an original corresponding to the image data, on receipt of a modification instruction operation from a user, displays a screen that guides such that an operation to input an appropriate paper size of an original is performed.

6. The image forming apparatus as defined in claim 5, wherein
   the preview image display control portion, on receipt of a paper size input operation from a user, modifies a paper size that is recorded in the paper size recording portion and corresponds to the image data displayed for previewing into an input paper size, and applies modification processing to image data, already stored, corresponding to the preview display, and displays a preview again.

* * * * *